US011690354B2

(12) United States Patent
Kittridge

(10) Patent No.: US 11,690,354 B2
(45) Date of Patent: Jul. 4, 2023

(54) COMPARTMENT FOR CARRYING ANIMAL ON VEHICLES WITH ADJUSTABLY SLIDING TOP

(71) Applicant: George Barton Kittridge, Placentia, CA (US)

(72) Inventor: George Barton Kittridge, Placentia, CA (US)

( * ) Notice: Subject to any disclaimer, the term of this patent is extended or adjusted under 35 U.S.C. 154(b) by 0 days.

(21) Appl. No.: 17/198,272

(22) Filed: Mar. 11, 2021

(65) Prior Publication Data

US 2021/0282363 A1  Sep. 16, 2021

Related U.S. Application Data

(60) Provisional application No. 62/988,018, filed on Mar. 11, 2020.

(51) Int. Cl.
*A01K 1/02* (2006.01)

(52) U.S. Cl.
CPC .......... *A01K 1/0281* (2013.01); *A01K 1/0245* (2013.01)

(58) Field of Classification Search
CPC ............................. A01K 1/0281; A01K 1/0236
See application file for complete search history.

(56) References Cited

U.S. PATENT DOCUMENTS

| 5,671,697 | A * | 9/1997 | Rutman | A01K 15/02 |
| | | | | 119/472 |
| 6,250,529 | B1 * | 6/2001 | Babbitt | A01K 1/0281 |
| | | | | 119/482 |
| 6,523,499 | B1 * | 2/2003 | Chrisco | A01K 1/0245 |
| | | | | 119/496 |
| 2005/0217599 | A1 * | 10/2005 | Varner | A01K 1/0281 |
| | | | | 119/496 |
| 2005/0284403 | A1 * | 12/2005 | Delino | A01K 1/0245 |
| | | | | 119/497 |
| 2009/0114688 | A1 * | 5/2009 | Beeler | B62J 9/23 |
| | | | | 119/500 |
| 2013/0220231 | A1 * | 8/2013 | Hovsepian | B62J 9/24 |
| | | | | 119/496 |

(Continued)

FOREIGN PATENT DOCUMENTS

| BR | PI1000842 A2 * | 3/2011 |
| EP | 0538542 A1 * | 4/1993 |

*Primary Examiner* — Jessica B Wong
(74) *Attorney, Agent, or Firm* — Camuti Law Group APC; Nathan Camuti

(57) ABSTRACT

A system for carrying animals on a vehicle including an animal carrying compartment wherein a front end includes a portal through which an animal may pass, and wherein the animal carrying compartment includes an upper portion and a lower portion, wherein the upper portion is selectively configurable in one of a partially open configuration and an fully open configuration. A method for transporting an animal on a motorcycle, the method comprising installing a mounting hardware on a docking hardware of a motorcycle, the mounting hardware configured to engage an animal carrying device, securing the animal carrying device to the mounting hardware, configuring an upper portion of the animal carrying device for transporting an animal, placing an animal in the animal carrying device, securing a door of the animal carrying device, and travelling from a first location to a second location.

13 Claims, 5 Drawing Sheets

(56) References Cited

U.S. PATENT DOCUMENTS

| | | | |
|---|---|---|---|
| 2019/0254252 A1* | 8/2019 | Johnson, Jr. | B62J 9/23 |
| 2020/0060219 A1* | 2/2020 | Levin | A01K 1/033 |
| 2020/0329666 A1* | 10/2020 | Blood | B62J 9/21 |

* cited by examiner

COMPARTMENT FOR CARRYING ANIMAL ON VEHICLES WITH ADJUSTABLY SLIDING TOP

RELATED APPLICATION(S)

The present application claims the benefit of and priority to a U.S. Provisional Patent Application Ser. No. 62/988,018, filed Mar. 11, 2020, which is hereby incorporated by reference in its entirety into the present application.

SUMMARY

The present disclosure includes a system for carrying animals on a vehicle including an animal carrying compartment having a base, a top, a front end, a rear end opposite the front end, and a pair of opposing side walls, wherein the front end includes a portal through which an animal may pass, and wherein the animal carrying compartment includes an upper portion and a lower portion, wherein the upper portion is selectively configurable in one of a partially open configuration and an fully open configuration.

In some embodiments, the upper portion of the animal carrying compartment comprises an upper portion of the opposing sidewalls and an upper portion of the rear end of the animal carrying compartment.

In some embodiments, the upper portion of the animal carrying compartment is slidably connected to the lower portion of the animal carrying compartment.

In some embodiments, the lower portion of the animal carrying compartment is configured to engage with a mounting bracket.

In some embodiments, the system further comprises a mounting bracket configured to engage with a docking hardware of a motor vehicle.

In some embodiments, an exterior of the animal carrying compartment includes aerodynamic features to reduce at least one of a drag and a turbulence caused by the animal carrying device when the animal carrying compartment is mounted on a motor vehicle that is in motion.

In some embodiments, the portal of the front end includes a door secured by a latch when the door is in a closed configuration.

In some embodiments, the latch is an animal-operable latch.

In some embodiments, the upper portion includes a latch for securing the upper portion in one of the partially open configuration and the fully open configuration.

In some embodiments, the lower potion includes a plurality of configuration portals for receiving the latch to secure the upper portion in position.

Another component of the present disclosure includes a method for transporting an animal on a motorcycle, the method comprising installing a mounting hardware on the docking hardware of a motorcycle, the mounting hardware configured to engage an animal carrying device, securing the animal carrying device to the mounting hardware, configuring an upper portion of the animal carrying device for transporting an animal, placing an animal in the animal carrying device, securing a door of the animal carrying device, and travelling from a first location to a second location.

In other implementations, the method includes removing the animal from the animal carrying device after arriving at the second location.

In other implementations, configuring the upper portion of the animal carrying device for transporting an animal includes selecting a desired position of the upper portion of the animal carrying device relative to a lower portion of the animal carrying device, and operating a securing mechanism to retain the upper portion of the animal carrying device in the desired position during transportation of the animal.

DETAILED DESCRIPTION

Figure 1:
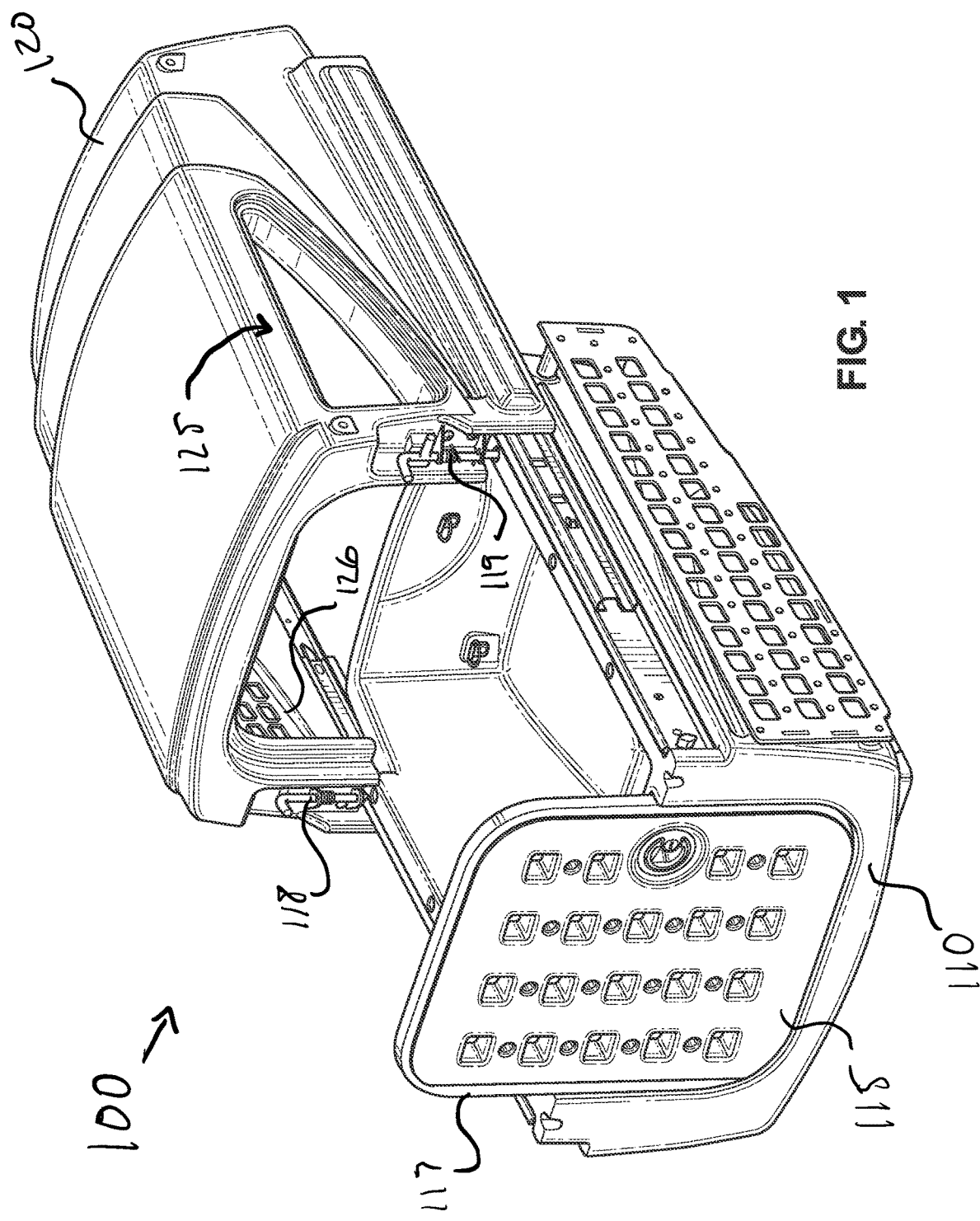
FIG. 1 shows a diagram of an exemplary animal carrying system for vehicles, according to one embodiment of the present disclosure.

The following description contains specific information pertaining to implementations in the present disclosure. The drawings in the present application and their accompanying detailed description are directed to merely exemplary embodiments. Unless noted otherwise, like or corresponding elements among the figures may be indicated by like or corresponding reference numerals. Moreover, the drawings and illustrations in the present application are generally not to scale and are not intended to correspond to actual relative dimensions.

FIG. 1 shows a diagram of an exemplary animal carrying system for vehicles, according to one embodiment of the present disclosure. Animal carrying device 100 is designed for use with a wheeled vehicle. In some embodiments, animal carrying device 100 may be used to carry an animal on a two-wheeled vehicle, such as a motorcycle, a scooter, or on a three-wheeled vehicle, such as a motorized tricycle. In other embodiments, animal carrying device 100 may be used to carry an animal on other motorized or unmotorized vehicles. Animal carrying device 100 may be used to transport other items, such as delivery items, when animal carrying device 100 is not carrying an animal.

As shown in FIG. 1, animal carrying device has a bottom, top, and four sides extending from the bottom to the top. In some embodiments, the four sides include a front, a rear opposite the front, and two opposing sides. Each of the opposing sides and the rear may include a ventilation aperture. The ventilation aperture may be open, partially ventilated, selectively closed, or closed. As shown in FIG. 1, ventilation aperture 125 is open and ventilation aperture 126 is covered with a partially ventilating cover. In some embodiments, the ventilation aperture covers may be removable. The user may selectively install ventilation aperture covers depending on a desired configuration. For example, the user may leave the ventilation aperture open or install a ventilated cover when riding in warmer weather, such as a spring or summer afternoon ride. In other situations, such as when riding in cooler weather or precipitation, the user may install covers to cover the ventilation apertures, allowing the animal riding in animal carrying device 100 to remain warmer and drier. In other embodiments, the covers may include a sliding section or hinged door for selectively closing the ventilation apertures.

The front side of animal carrying device 100 includes portal 117 through which an animal may be loaded into animal carrying device 100 or unloaded from animal carrying device 100. Portal 117 may be closed with door 115. In some embodiments, door 115 may be hinged on one side and open about a vertical axis near a corner of animal carrying device 100. In other embodiments, door 115 may be hinged on a top side or a bottom side of door 115 and may open about a horizontal axis, opening by rotating an edge of door 115 upwards or downwards to allow passage of an animal into or out of animal carrying device 100.

In some embodiments, door 115 may be a solid door, a partially vented door, or a fully vented door. In some embodiments, door 115 may be a wire mesh door or a cage door. Door 115 may have vertical bars, horizontal bars, a combination of vertical and horizontal bars, interwoven vertical and horizontal bars. door 115 may open in a way that allows an animal, such as a dog, to enter animal carrying device 100 without the aid of a human, other than the human opening door 115. Door 115 may open in a way that allows an animal to exit the animal carrying device without the aid of a human, other than the human opening door 115. When door 115 is in a closed position, it may be secured in place by a latch. In some embodiments, the latch may be a spring latch and the user may open the latch by operating a latch release. The spring latch may be closed by closing door 115 with sufficient force to move passed the spring latch and allowing the latch to return to a latched position, securing door 115 in a closed position. In other embodiments, the latch may be a magnetic latch or a lift-and-slide latch such as a barrel bolt latch or a gate latch. The latch may include an external animal-operable latch allowing the animal to open door 115 from the outside to self-load into the animal carrying device. In other embodiments, door 115 may be secured closed with a lock which may be operated by a key. Animal carrying device 100 may include lower portion 110 and upper portion 120. In some embodiments, upper portion 120 may be selectively opened to one or more positions. In some embodiments, upper portion 120 may include one or more latches for selectively securing upper portion 120 in a partially or fully open configuration. As shown in FIG. 1, animal carrying device 100 includes latch 118 and latch 119. Lower portion 110 may include a number of securing portals for receiving latch 118 and latch 119 to secure upper portion 120 in a partially or fully open configuration.

Figure 2:
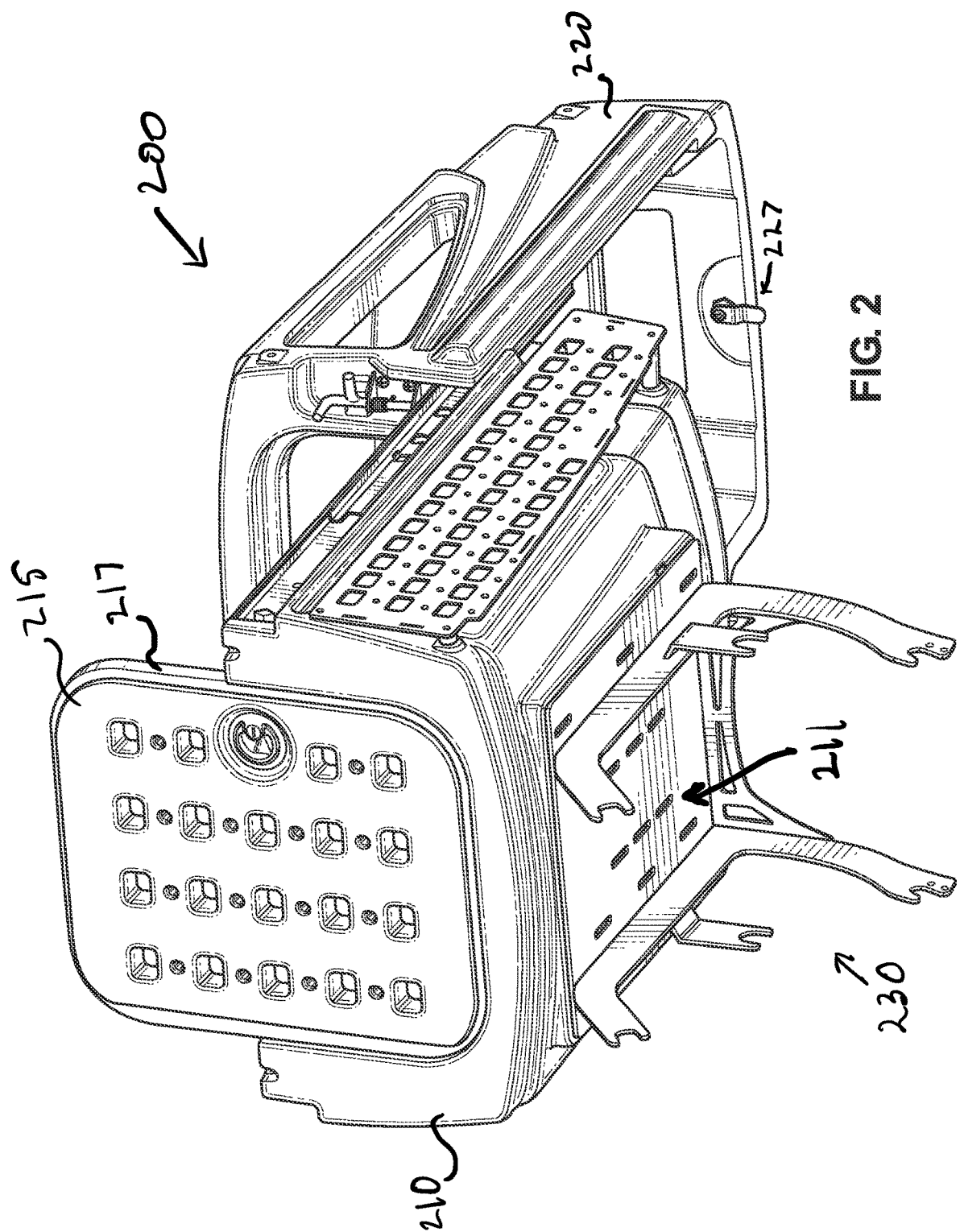
FIG. 2 shows a diagram of a lower perspective view of the animal carrying system for vehicles of FIG. 1, according to one embodiment of the present disclosure.

FIG. 2 shows a diagram of a lower perspective view of the animal carrying system for vehicles of FIG. 1, according to one embodiment of the present disclosure. In other embodiments, animal carrying device 200 may include mounting bracket 230. In some embodiments, animal carrying device 200 may mount on mounting bracket 230 on an external portion, such as on the external side of the bottom or on the external portion, as shown in FIG. 2, or on one of the opposing sides of animal carrying device 200 (not shown). Mounting bracket 230 may allow animal carrying device 200 to be mounted securely on the vehicle. In some embodiments, mounting bracket 230 may include one or more slides for engaging a slide mount, for example, on a second seat or rear fender of a motorcycle. As shown in FIG. 2, mounting bracket 230 is configured for the mounting hardware of a particular motorcycle. Different motorcycle manufacturers may have their own docking hardware configurations. In some embodiments, animal carrying device 200 may include a plurality of mount engagement slots 211 configured to engage with mounting hardware from one or more motorcycle docking hardware configurations. Mounting bracket 230 may be designed to match the docking hardware of a particular motor vehicle manufacturer. Different embodiments, mounting bracket 230 may be configured to affix to the docking hardware of different brands of motorcycle. Such embodiments will enable animal carrying device 200 to be used on vehicles from different manufacturers.

A secure connection between animal carrying device 200 and the vehicle on which it is mounted is important for safety of the animal transported therein, as well as the driver or rider of the vehicle. Mounting bracket 230 interfacing with the specific docking hardware of the motorcycle on which it is mounted increases the security of animal carrying device 200 during travel and increases the safety of an animal carried therein in the event of a crash.

In some embodiments, animal carrying device 200 may be releasably attached to mounting bracket 230 such that animal carrying device 200 is secured in place for travel, transportation, and storage, and may be detached by a user operating a release, for example, when the user arrives at a destination such as the home of the user. The releasable attachment may include a mechanical attachment system allowing the user to operate a mechanical release to detach the animal carrying device from the vehicle. The releasable attachment may include a magnetic attachment system allowing the user to operate a magnetic release to detach the animal carrying device from the vehicle. The releasable attachment may include an electronic attachment system allowing the user to operate an electronic or software release to detach the animal carrying device from the vehicle. In some embodiments, animal carrying device 200 may include a carrying handle (not shown) and my be used as a carrying device to transport an animal by manual carrying after removal from the vehicle.

As shown in FIG. 2, animal carrying device 200 includes locking mechanism 227. Locking mechanism 227 may allow a user to lock upper portion 220 in a closed configuration with respect to lower portion 210. When upper portion 220 is arranged in a closed configuration, the user may operate locking mechanism 227 to restrict access to the pet compartment of animal carrying device 200. When upper portion 220 is arranged in an open configuration, portal 217 frames door 215, holding door 215 in place. The lower portion of portal 217 may be securely mounted in lower portion 210. Maintaining portal 217 secure in lower portion 210 may allow the user to arrange animal carrying device 200 in a configuration allowing an animal transported therein to have access to open air, such as by sticking its head out of the partially open animal carrying device 200, while maintaining an opening between portal 217 and upper portion 220 that the animal's body will not easily fit through. This can allow for an animal, such as a dog, to enjoy the thrill of riding with its head in the open air while maintaining the safety of the animal.

Figure 3:
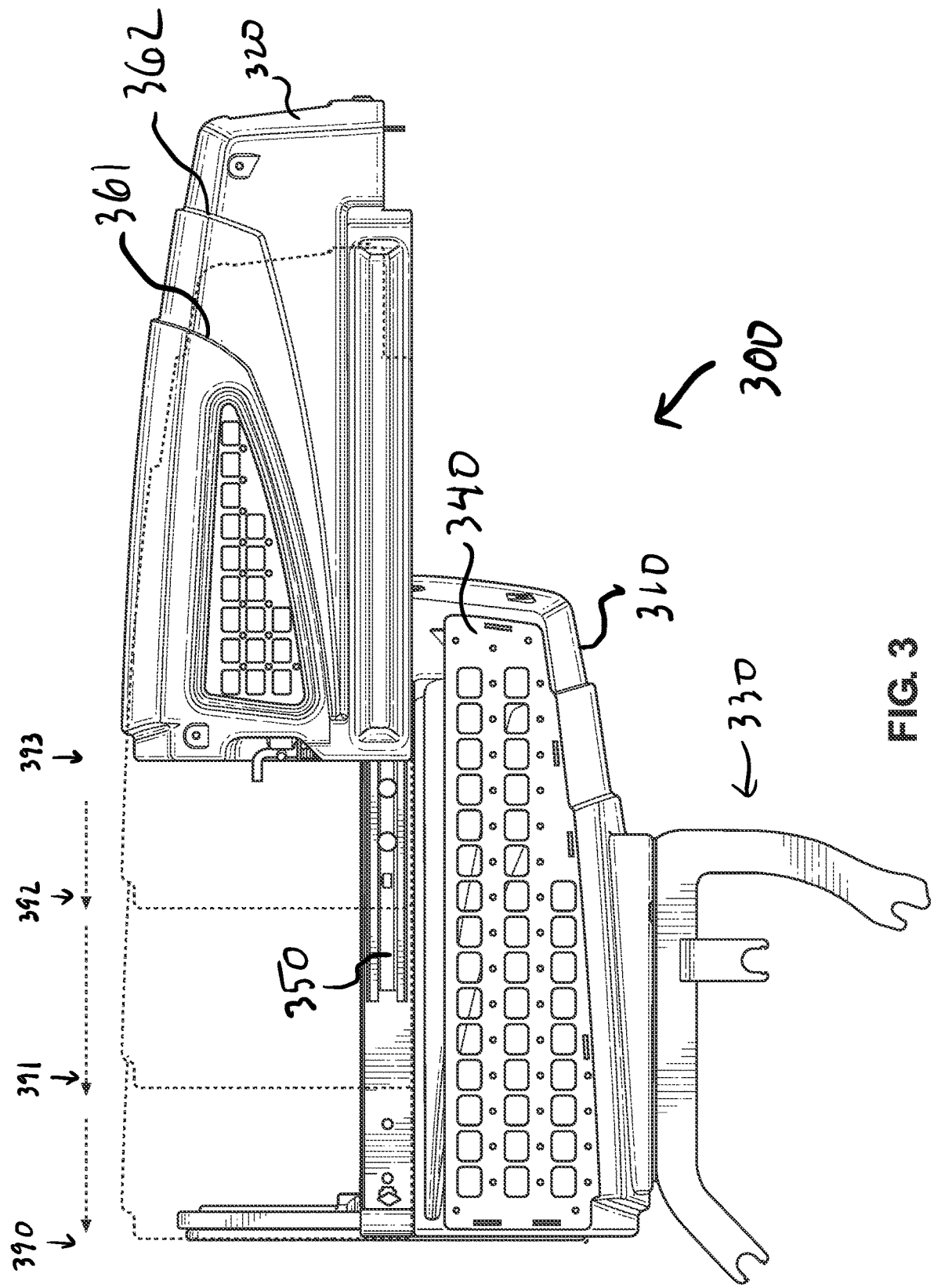
FIG. 3 shows a diagram of a side view of the animal carrying system for vehicles of FIG. 1, according to one embodiment of the present disclosure.

FIG. 3 shows a diagram of a side view of the animal carrying system for vehicles of FIG. 1, according to one embodiment of the present disclosure. As shown in FIG. 3, upper portion 320 is mounted on lower portion 310 and connected in a way that allows the user to open upper portion 320. Upper portion 320 may be slidably attached to lower portion 310 by a sliding mechanism, such as a track-and-rail system or a linear ball-bearing system, as depicted by track 350. In some embodiments, upper portion 320 may open to one of various predetermined opening segments. A user may arrange animal carrying device 300 in a closed configuration with upper portion 320 at position 390, in a partially open configuration, such as a one-third open position with upper portion 320 at position 391, in a two-thirds open configuration with upper portion 320 at position 392, in a fully-open configuration with upper portion 320 at position 393. In other embodiments, partially open configurations may have pre-determined intervals dividing the opening into quarters, fifths, etc. In other embodiments, upper portion 320 may slide open and remain in place wherever the user chooses along track 350.

The external surfaces of the animal carrying device may be aerodynamic in design. Adding a large animal carrier to a motorcycle may increase the weight and drag, making the aerodynamics of paramount importance. The animal carrying device may be tapered to allow airflow to pass over the surface and reduce the amount of turbulence and drag resulting from the additional structure. In some embodiments, the animal carrying device may include aerodynamic features to direct airflow and reduce or control turbulence and drag. As shown in FIG. 3, feature 361 and feature 362 may reduce turbulence as air flows over animal carrying device 300. Feature 361 and feature 362 may reduce drag as air flows over animal carrying device 300. The external surface of the animal carrying device may be a smooth surface to reduce turbulence and drag. An aerodynamic design may increase the stability and security of the animal carrying device, as well. By reducing the turbulence, animal carrying device 300 may remain more securely in place, reducing the vibrations and stresses on the mounting hardware that may result in loosening of the hardware. In some embodiments, venting panel 340 may be mounted to animal carrying device 300. Venting panel may be used to control airflow over, control the temperature inside the compartment, or used to create a storage space.

Figure 4:
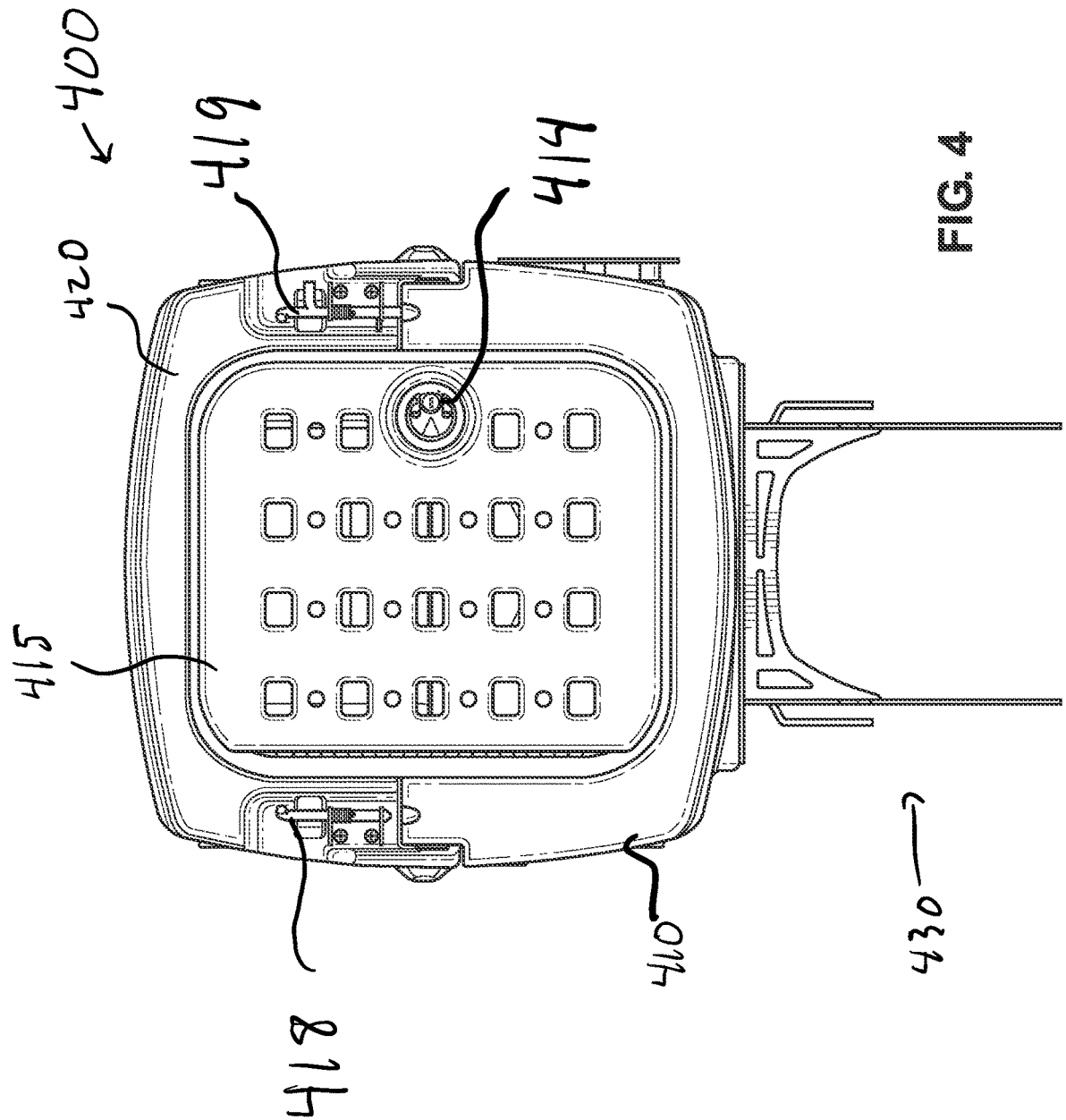
FIG. 4 shows a diagram of a front view of the animal carrying system for vehicles of FIG. 1, according to one embodiment of the present disclosure.

FIG. 4 shows a diagram of a front view of the animal carrying system for vehicles of FIG. 1, according to one embodiment of the present disclosure. As shown in FIG. 4, latch 418 is in an open position, disengaged from lower portion 410. Latch 419 is depicted in a closed position, engaging lower portion 410. Operation of latches 418 and 419 may allow the user to open and close upper portion 420. Once upper portion 420 is in the desired position, the user may release the latches to engage the securing element to hold upper portion 420 in place.

As shown in FIG. 4, door 415 includes lock 414. Lock 414 provides the user with the security to lock animal carrying device 400. Securing animal carrying device 400 may allow a user to keep the animal transported therein safe during events such as a stop at a gas station. The rider may need to leave animal carrying device 400 to enter the gas station and pay for gas or supplies, or to use the restroom. Because animal carrying device 400 is securely mounted mounting hardware 430 and secured by lock 414 and locking mechanism 227, the user can feel safe leaving her/his pet for the brief time s/he is away.

Figure 5:
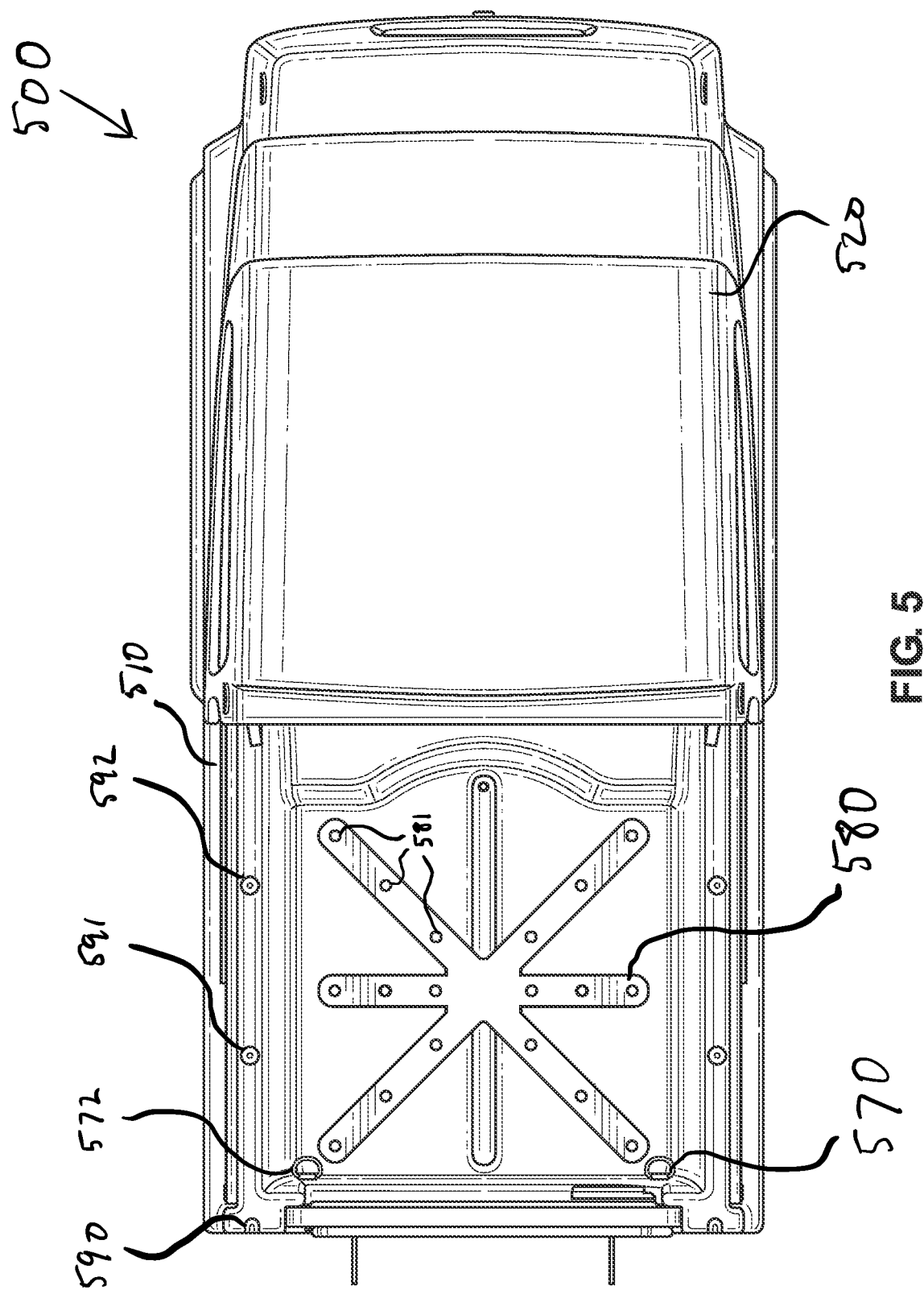
FIG. 5 shows a top view of the exemplary animal carrying system for vehicles of FIG. 1, according to one embodiment of the present disclosure.

FIG. 5 shows a top view of the exemplary animal carrying system for vehicles of FIG. 1, according to one embodiment of the present disclosure. The body of animal carrying device 500 may be made from durable material, such as plastic, fiberglass, resin, etc. In some embodiments, animal carrying device 500 may include a metal plate inside, such as mounting plate 580. Animal carrying device 500 may mount to a mounting plate on the top of mounting hardware 430. Mounting holes 581 through mounting plate 580 and the bottom of animal carrying device 500 may allow securing bolts or other mounting hardware (not shown) to be securely retained in place and to securely hold animal carrying device 500 in place while the vehicle to which it is mounted is in motion. Additionally, the metal plate may provide security and integrity to hold the animal carrying device in place in the unfortunate occurrence of an accident.

As shown in FIG. 5, lower portion 510 includes securing portals 590, 591, and 592 corresponding to the fully closed, one-third open, and two-thirds open configurations of upper portion 520 depicted in FIG. 3. Upper portion 520 further includes a securing portal corresponding to the fully open configuration depicted in FIG. 5, but that securing portal is obscured from view by upper portion 520.

To secure an animal while the vehicle is in motion, animal carrying device 500 may include an internal animal retention element mounts, such as retention elements 570 and 572. The internal animal retention element mounts may include brackets, loops, or hooks to which a retention cord or leash may be connected. The internal animal retention element may include a leash that can be connected to the collar or harness of an animal transported in animal carrying device 500. In other embodiments, the internal animal retention element may be a cord, rope, cable, or other securing element extending across the width of the animal carrying device or extending along the length of the animal carrying device. The leash of the animal being transported in animal carrying device 500 may be attached to the internal animal retention element to allow movement of the animal within animal carrying device 500 but securing the animal against jumping out before the user disengages the internal animal retention element.

The animal carrying device may be customizable in various ways. For example, the animal carrying device may optionally include interior padding, interior fabric treatment, such as interior upholstery, addition of saddlebags or external animal carrying device-mounted storage units for transporting animal accessories, such as leash, food and water dishes, sweaters and jackets, goggles and other riding equipment, and dog toys.

In some embodiments, the animal carrying device may come in various size-appropriate dimensions. For example, the animal carrying device may come in a small size for dogs up to about 20 pounds, a medium size for dogs between about 20 pounds an about 50 pounds, and a large size for dogs between about 50 pounds up to about 80 pounds. Other sizes and size/weight ranges may apply.

From the above description, it is manifest that various systems and devices can be used for implementing the systems and devices described in the present application without departing from the scope of those concepts. Moreover, while the systems and devices have been described with specific reference to certain implementations and embodiments, a person having ordinary skill in the art would recognize that changes can be made in form and detail without departing from the scope of those improvements. As such, the described implementations and embodiments are to be considered in all respects as illustrative and not restrictive. It should also be understood that the present application is not limited to the particular implementations and embodiments described above, but many rearrangements, modifications, and substitutions are possible without departing from the scope of the present disclosure.

What is claims is:

1. A system for carrying animals on a vehicle including:
    an animal carrying compartment having a base, a top, a front end, a rear end opposite the front end, and a pair of opposing side walls, wherein the front end includes a portal through which an animal may pass, and wherein the animal carrying compartment includes an upper portion and a lower portion, wherein the upper portion is selectively configurable in one of a partially open configuration and a fully open configuration when the upper portion slides in a rearward direction from a closed configuration to one of the partially open configuration and the fully open configuration and is secured in the selected configuration with a securing element.

2. The system of claim 1, wherein the upper portion of the animal carrying compartment comprises an upper portion of the opposing sidewalls and an upper portion of the rear end of the animal carrying compartment.

3. The system of claim 1, wherein the upper portion of the animal carrying compartment is slidably connected to the lower portion of the animal carrying compartment.

4. The system of claim 1, wherein the lower portion of the animal carrying compartment is configured to engage with a mounting bracket.

5. The system of claim 1, further comprising a mounting bracket configured to engage with a docking hardware of a motor vehicle.

6. The system of claim 1, wherein an exterior of the animal carrying compartment includes aerodynamic features to reduce at least one of a drag and a turbulence caused by the animal carrying device when the animal carrying compartment is mounted on a motor vehicle that is in motion.

7. The system of claim 1, wherein the portal of the front end includes a door secured by a latch when the door is in a closed configuration.

8. The system of claim 7, wherein the latch is an animal-operable latch.

9. The system of claim 1, wherein the securing element is a latch for securing the upper portion in one of the closed configuration, the partially open configuration, and the fully open configuration.

10. The system of claim 9, wherein the lower portion includes a plurality of configuration portals for receiving the latch to secure the upper portion in position.

11. A method for transporting an animal on a motorcycle, the method comprising:
   installing a mounting hardware on a docking hardware of a motorcycle, the mounting hardware configured to engage an animal carrying device;
   securing the animal carrying device to the mounting hardware;
   configuring an upper portion of the animal carrying device for transporting an animal by sliding the upper portion in a rearward direction relative to a lower portion from a closed configuration to one of a partially open configuration and a fully open configuration and securing the upper portion in one of the partially open configuration and the fully open configuration with a securing element;
   placing an animal in the animal carrying device;
   securing a door provided on a front end of the animal carrying device; and
   travelling from a first location to a second location.

12. The method of claim 11, further comprising removing the animal from the animal carrying device after arriving at the second location.

13. The method of claim 11, wherein configuring the upper portion of the animal carrying device for transporting an animal includes:
   selecting a desired position of the upper portion of the animal carrying device relative to a lower portion of the animal carrying device; and
   operating a securing mechanism to retain the upper portion of the animal carrying device in the desired position during transportation of the animal.

* * * * *